United States Patent
Furusawa et al.

(10) Patent No.: US 10,899,293 B2
(45) Date of Patent: Jan. 26, 2021

(54) BODY EARTH STRUCTURE FOR VEHICLE AND BODY EARTH PATH FORMING METHOD

(71) Applicant: TOYOTA JIDOSHA KABUSHIKI KAISHA, Toyota (JP)

(72) Inventors: Takashi Furusawa, Toyota (JP); Eiji Yoshida, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 16/253,808

(22) Filed: Jan. 22, 2019

(65) Prior Publication Data

US 2019/0248307 A1    Aug. 15, 2019

(30) Foreign Application Priority Data

Feb. 9, 2018    (JP) .................................. 2018-021652

(51) Int. Cl.
| | |
|---|---|
| *H01R 4/66* | (2006.01) |
| *B60R 16/02* | (2006.01) |
| *H01R 4/64* | (2006.01) |
| *H01R 4/34* | (2006.01) |
| *H01R 4/30* | (2006.01) |

(52) U.S. Cl.
CPC ......... *B60R 16/0215* (2013.01); *H01R 4/304* (2013.01); *H01R 4/34* (2013.01); *H01R 4/64* (2013.01)

(58) Field of Classification Search
CPC ........ B60R 16/0215; H01R 4/30; H01R 4/34; H01R 4/304; H01R 4/64
USPC .................................................... 439/92–108
See application file for complete search history.

(56) References Cited

U.S. PATENT DOCUMENTS

| | | | |
|---|---|---|---|
| 4,873,763 A * | 10/1989 | Volonta | H01R 4/64 29/825 |
| 5,980,178 A | 11/1999 | Ono | |
| 2017/0349220 A1 | 12/2017 | Yamada et al. | |
| 2019/0237883 A1* | 8/2019 | Umemura | H01R 4/34 |

FOREIGN PATENT DOCUMENTS

| | | |
|---|---|---|
| CN | 107206462 A | 9/2017 |
| JP | H10-238527 A | 9/1998 |
| JP | 2001-223038 A | 8/2001 |
| JP | 2004-200131 A | 7/2004 |
| JP | 2009-052602 A | 3/2009 |

* cited by examiner

*Primary Examiner* — Khiem M Nguyen
(74) *Attorney, Agent, or Firm* — Oliff PLC (57) ABSTRACT

A body earth structure for a vehicle includes a bolt of which a head portion is swage-joined to an aluminum vehicle body panel. The bolt is provided to fasten an earth terminal to the vehicle. The bolt includes a projection that protrudes toward the vehicle body panel, on a facing surface of the head portion of the bolt. The facing surface is provided to face the vehicle body panel.

6 Claims, 8 Drawing Sheets

FIG. 8
RELATED ART

BODY EARTH STRUCTURE FOR VEHICLE AND BODY EARTH PATH FORMING METHOD

INCORPORATION BY REFERENCE

The disclosure of Japanese Patent Application No. 2018-021652 filed on Feb. 9, 2018 including the specification, drawings and abstract is incorporated herein by reference in its entirety.

BACKGROUND

1. Technical Field

The disclosure relates to a body earth structure for a vehicle and a body earth path forming method. In particular, the disclosure relates to an improvement for securing an earth path for an electrical component.

2. Description of Related Art

In the related art, a body earth type earth path is adopted as an earth path connected to an electrical component (hereinafter, may be referred to as auxiliary device) of a vehicle, as disclosed in Japanese Unexamined Patent Application Publication No. 2001-223038 (JP 2001-223038 A). In this case, an earth terminal that is attached to a wire harness extending from the auxiliary device is fastened to a vehicle body panel via a bolt or the like.

In the case of a general structure in which an earth terminal is fastened to a vehicle body panel that is formed using a steel sheet, the vehicle body panel is provided with a stud bolt and a nut is screwed onto the stud bolt in a state where the stud bolt is inserted into the annular earth terminal attached to a wire harness, so that the earth terminal is electrically connected to the vehicle body panel via the stud bolt. Although the stud bolt is subjected to zinc plating, the stud bolt and the vehicle body panel are favorably electrically connected to each other through a weld nugget which is formed since the stud bolt is welded to the vehicle body panel, and thus the earth terminal and the vehicle body panel are also favorably electrically connected to each other.

SUMMARY

Meanwhile, in a case where the above-described structure is adopted for a vehicle in which an aluminum vehicle body panel is used for reduction in weight of a vehicle body, the weldability between aluminum and iron (iron stud bolt) is not sufficiently achieved or a rustproofing treatment is performed on a stud bolt because of a possibility of electrolytic corrosion. Therefore, it becomes difficult to electrically connect the vehicle body panel and the stud bolt to each other.

Figure 8:
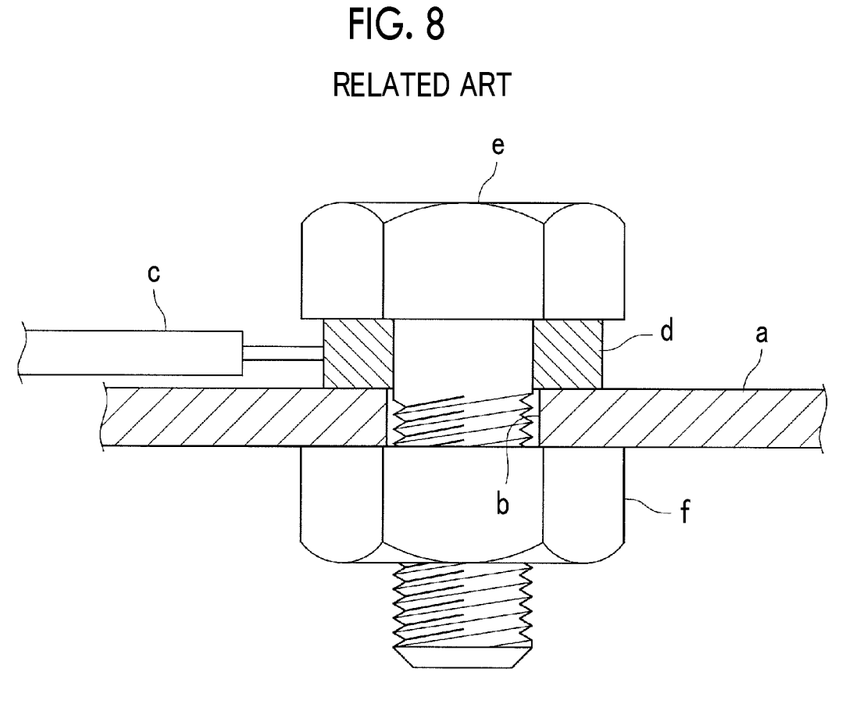
FIG. 8 is a sectional view illustrating a body earth structure according to the related art.

Therefore, in the case of an aluminum vehicle body panel, a structure as follows may be adopted. That is, a structure as illustrated in FIG. 8, in which a through-hole b is formed in a vehicle body panel a, an annular earth terminal d that is attached to a wire harness c is positionally aligned with the through-hole b from one side (upper side in FIG. 8), a bolt e is inserted into the earth terminal d and the through-hole b of the vehicle body panel a from the one side, and the bolt e is screwed into a nut f that is disposed on the other side such that an earth terminal d is brought into close contact with a vehicle body panel a and the earth terminal d and the vehicle body panel a are electrically connected to each other, may be adopted.

However, in the case of the above-described structure in which the through-hole b is formed in the vehicle body panel a, there is a possibility that water intrudes through the through-hole b and there is a possibility of rust or the like.

The disclosure provides a body earth structure for a vehicle and a body earth path forming method with which it is possible to secure an earth path without forming a through-hole in a vehicle body panel.

A first aspect of the disclosure relates to a body earth structure for a vehicle. The body earth structure includes a bolt. A head portion of the bolt is swage joined to an aluminum vehicle body panel and the bolt is provided to fasten an earth terminal to the vehicle. The bolt includes a projection that protrudes toward the vehicle body panel, on a facing surface of the head portion of the bolt, and the facing surface is provided to face the vehicle body panel.

According to the first aspect of the disclosure, a rustproofing treatment is performed on the bolt because of a possibility of electrolytic corrosion in a case where the head portion of the bolt is swage-joined to the aluminum vehicle body panel. The rustproofing treatment inhibits electrical connection between the vehicle body panel and the bolt. Since the projection that protrudes toward the vehicle body panel is provided on the facing surface of the head portion of the bolt that faces the vehicle body panel, the projection comes into contact with the vehicle body panel and a rustproofing treatment layer is peeled off when the head portion of the bolt is swage-joined to the vehicle body panel. Accordingly, the vehicle body panel and the bolt are favorably electrically connected to each other. That is, it is possible to favorably secure an earth path extending over the earth terminal, the bolt, and the vehicle body panel without forming a through-hole in the vehicle body panel.

A second aspect of the disclosure relates to a body earth structure for a vehicle. The body earth structure includes a bolt and a conductive adhesive agent. A head portion of the bolt is swage joined to an aluminum vehicle body panel and the bolt is provided to fasten an earth terminal to the vehicle. The conductive adhesive agent is interposed between a facing surface of the head portion of the bolt and the vehicle body panel, and the facing surface is provided to face the vehicle body panel.

According to the second aspect of the disclosure, it is possible to favorably electrically connect the vehicle body panel and the bolt to each other via the conductive adhesive agent while eliminating a possibility of electrolytic corrosion caused by the aluminum vehicle body panel and the bolt with the conductive adhesive agent interposed between the vehicle body panel and the bolt. That is, it is possible to favorably secure an earth path extending over the earth terminal, the bolt, and the vehicle body panel without forming a through-hole in the vehicle body panel.

A third aspect of the disclosure relates to a body earth structure for a vehicle. The body earth structure includes a bolt and a conductive adhesive agent. A head portion of the bolt is swage-joined to an aluminum vehicle body panel, and the bolt is provided to fasten an earth terminal to the vehicle and includes a projection that protrudes toward the vehicle body panel, on a facing surface of the head portion of the bolt. The facing surface is provided to face the vehicle body panel. The conductive adhesive agent is interposed between the facing surface of the head portion of the bolt and the vehicle body panel.

According to the third aspect of the disclosure, it is possible to achieve the effects of the first and second aspects of the disclosure and it is possible to favorably secure an earth path extending over the earth terminal, the bolt, and the vehicle body panel without forming a through-hole in the vehicle body panel.

In the above-described aspects, the head portion of the bolt may be provided with a protruding portion and a recessed portion. The protruding portion is provided by an outer edge of the head portion protruding in a direction of the facing surface. The recessed portion is a region positioned radially inward of the protruding portion and is approximately circular as seen in a plan view. An outer circumferential side surface of the protruding portion may be outwardly inclined toward the facing surface, and an inner circumferential side surface of the protruding portion may be outwardly inclined toward the recessed portion.

In the above-described aspects, the bolt may be subjected to a rustproofing treatment.

A fourth aspect of the disclosure relates to a body earth path forming method for a vehicle in which a head portion of a bolt is swage-joined to an aluminum vehicle body panel and an earth terminal is fastened via the bolt. The body earth path forming method includes providing a projection that protrudes toward the vehicle body panel on a facing surface of the head portion of the bolt, the facing surface being provided to face the vehicle body panel, and swage-joining the head portion of the bolt to the vehicle body panel. According to the fourth aspect of the disclosure, it is possible to achieve the same effect as that of the first aspect of the disclosure.

A fifth aspect of the disclosure relates to a body earth path forming method for a vehicle in which a head portion of a bolt is swage-joined to an aluminum vehicle body panel and an earth terminal is fastened via the bolt. The body earth path forming method includes swage-joining the head portion of the bolt to the vehicle body panel in a state where a conductive adhesive agent is interposed between a facing surface of the head portion of the bolt and the vehicle body panel, the facing surface being provided to face the vehicle body panel. According to the fifth aspect of the disclosure, it is possible to achieve the same effect as that of the second aspect of the disclosure.

A sixth aspect of the disclosure relates to a body earth path forming method for a vehicle in which a head portion of a bolt is swage-joined to an aluminum vehicle body panel and an earth terminal is fastened via the bolt. The body earth path forming method includes providing a projection that protrudes toward the vehicle body panel, on a facing surface of the head portion of the bolt, the facing surface being provided to face the vehicle body panel, and swage-joining the head portion of the bolt to the vehicle body panel in a state where a conductive adhesive agent is interposed between the facing surface of the head portion of the bolt and the vehicle body panel. According to the sixth aspect of the disclosure, it is possible to achieve the same effect as that of the third aspect of the disclosure.

According to the aspects, the projection is provided on the facing surface of the head portion of the bolt that faces the vehicle body panel or the conductive adhesive agent is interposed between the facing surface of the head portion of the bolt that faces the vehicle body panel and the vehicle body panel in the structure in which the head portion of the bolt, with which the earth terminal is fastened, is swage-joined to the aluminum vehicle body panel in order to form an earth path. Therefore, it is possible to favorably secure an earth path extending over the earth terminal, the bolt, and the vehicle body panel without forming a through-hole in the vehicle body panel.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described based on drawings. As the embodiments, a case where the disclosure is applied as a body earth structure that uses a dash panel (panel that separates vehicle cabin and engine compartment from each other; vehicle body panel in disclosure) of a vehicle will be described. In addition, although the body earth structure is applied to a plurality of positions on the dash panel, the description here will be made by adopting one body earth structure as a representative. Note that, the body earth structure may be applied to various panels constituting a vehicle body and the application target thereof is not limited to the dash panel.

First Embodiment

Body Earth Structure

Figure 1:
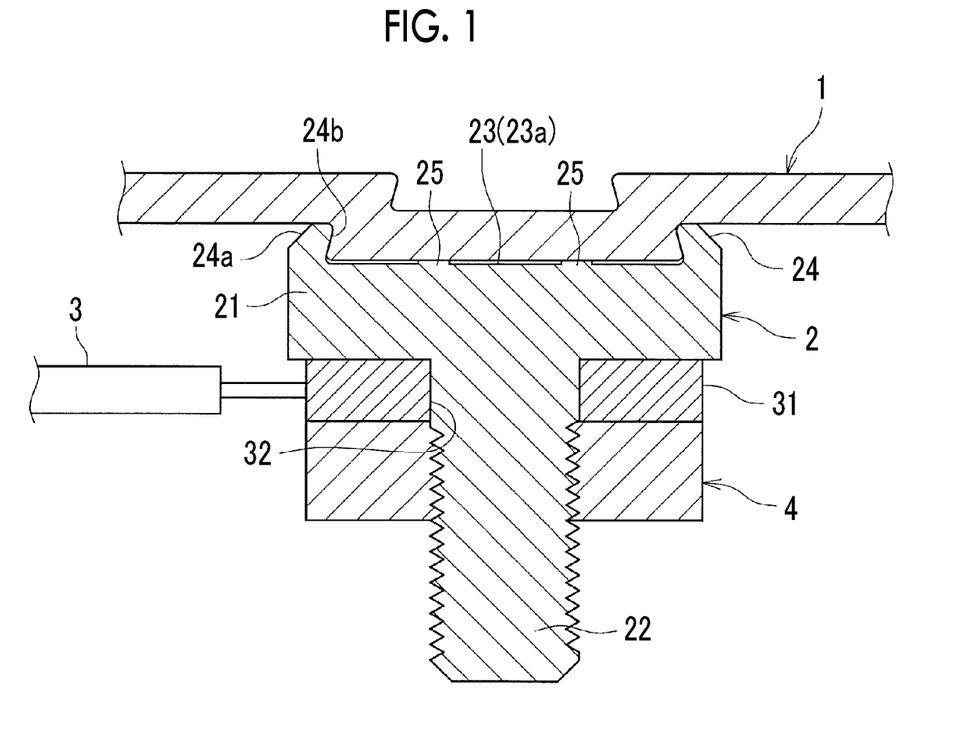
FIG. 1 is a sectional view illustrating a body earth structure according to a first embodiment.

FIG. 1 is a sectional view illustrating a body earth structure according to a present embodiment. As illustrated in FIG. 1, in the body earth structure according to the present embodiment, an iron bolt 2 is swage joined to an aluminum dash panel 1 and an earth terminal 31 attached to a wire harness 3 (wire harness extending from electrical component of vehicle) is fastened to the dash panel 1 via the bolt 2.

The dash panel 1 is molded through press working of an aluminum plate. Although not shown, the dash panel 1 is obtained by bonding a plurality of panels to each other with a self-pierce riveting (SPR) tool.

The bolt 2 is provided with a head portion 21 and a screw portion 22 and an end portion (upper end portion in FIG. 1) of the head portion 21 is swage joined to the dash panel 1. A recessed portion 23, into which a portion of the dash panel 1 is fitted after being deformed when the bolt 2 is swage-joined to the dash panel 1, is formed in the end portion of the bolt 2. A rustproofing treatment is performed on the bolt 2 because the bolt 2 is swage-joined to the aluminum dash panel 1 and thus there is a possibility of electrolytic corrosion.

Figure 2:
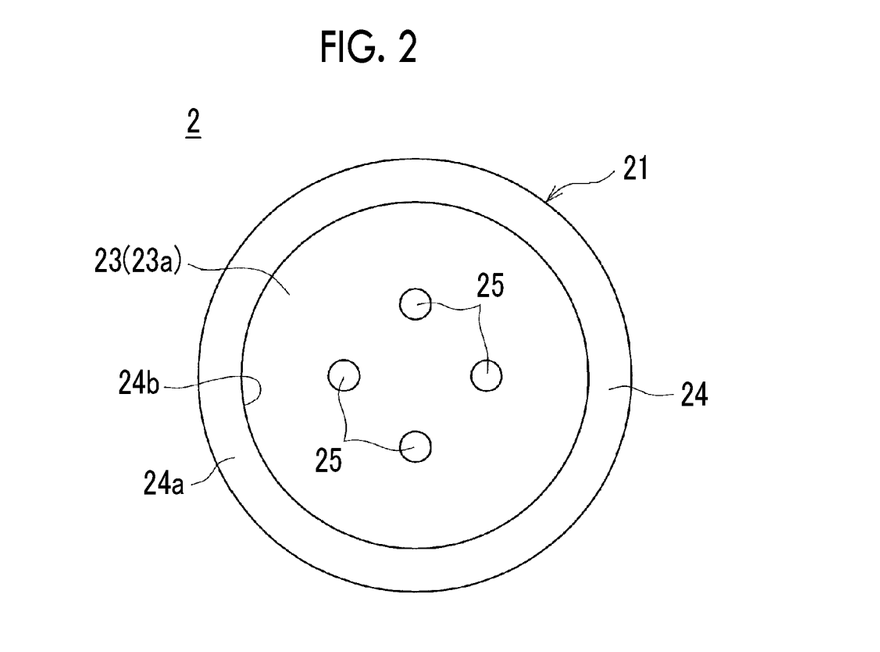
FIG. 2 is a plan view of a head portion of a bolt according to the first embodiment.

FIG. 2 is a plan view of the head portion 21 of the bolt 2. As illustrated in FIGS. 1 and 2, an outer edge portion of the head portion 21 of the bolt 2 is a protruding portion 24 that protrudes upward and a region positioned inward of the protruding portion 24 is the recessed portion 23, which is approximately circular as seen in the plan view. An outer circumferential side surface 24a of the protruding portion 24 is outwardly inclined toward a lower side. In addition, an inner circumferential side surface 24b of the protruding portion 24 is outwardly inclined toward the lower side (recessed portion 23 side).

Through a swaging operation which will be described later, a portion of the dash panel 1 is fitted into the recessed portion 23 of the head portion 21 of the bolt 2 and thus the head portion 21 of the bolt 2 is swage-joined to the dash panel 1.

The earth terminal 31 is formed in an annular shape provided with an opening 32 of which an inner diameter dimension is approximately the same as an outer diameter dimension of the screw portion 22 of the bolt 2. In a state where the screw portion 22 of the bolt 2 is inserted into the opening 32 of the earth terminal 31, a nut 4 is screwed onto the screw portion 22 of the bolt 2 and the earth terminal 31 is interposed between the head portion 21 of the bolt 2 and the nut 4. Accordingly, the bolt 2 and the earth terminal 31 are electrically connected to each other.

A feature of the present embodiment is that a surface 23a of the recessed portion 23 is provided with projections 25 (FIG. 1 illustrates state where projections 25 are crushed because of swage-joining).

As illustrated in FIG. 2, in the present embodiment, four projections 25 that protrude in a direction orthogonal to a surface 23a are provided on the surface 23a of the recessed portion 23 such that the projections 25 are separated from the central portion of the surface 23a by the same distance. Protrusion dimensions (height dimensions) of the projections 25 can be randomly set.

Figure 3A:
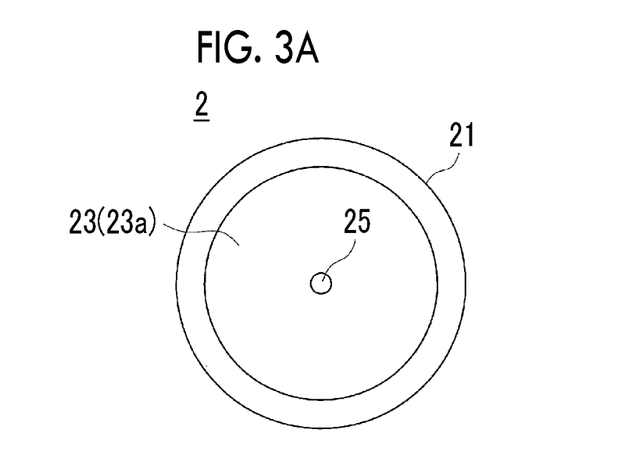
FIG. 3A is a plan view of a head portion of a bolt according to a modification example.
Figure 3B:
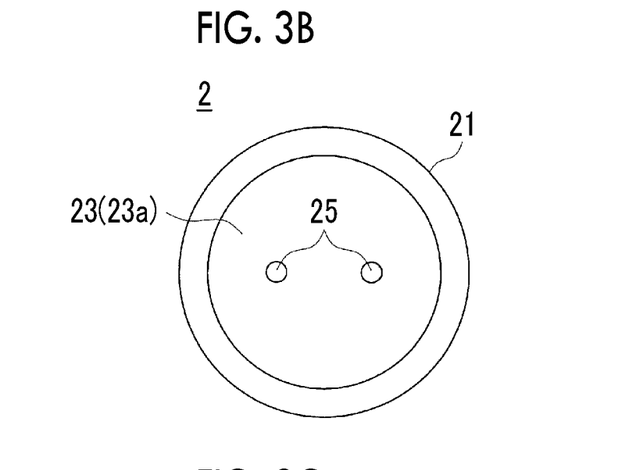
FIG. 3B is a plan view of a head portion of a bolt according to a modification example.
Figure 3C:
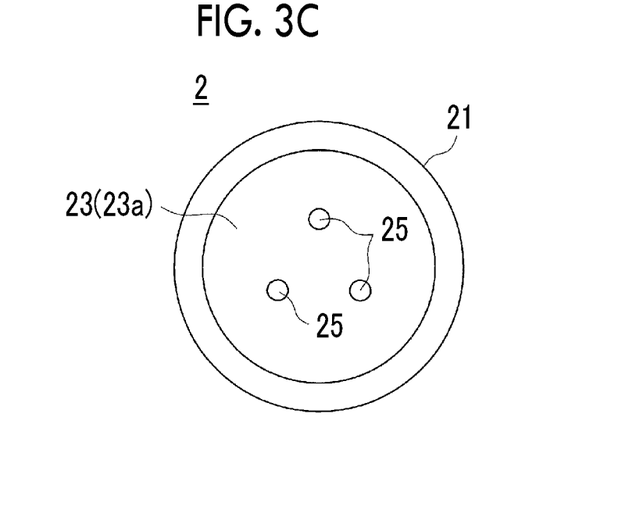
FIG. 3C is a plan view of a head portion of a bolt according to a modification example.
Figure 3D:
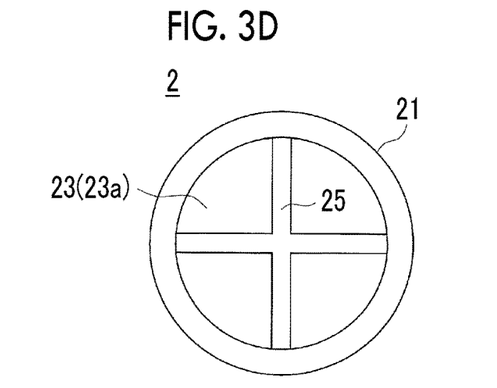
FIG. 3D is a plan view of a head portion of a bolt according to a modification example.
Figure 3E:
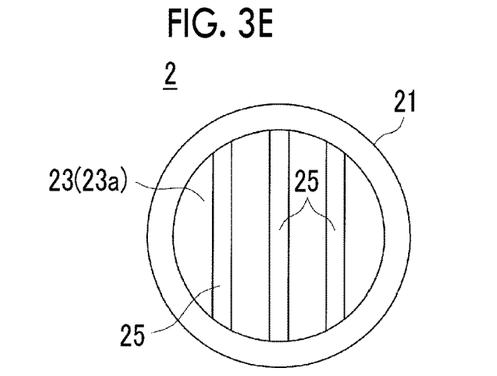
FIG. 3E is a plan view of a head portion of a bolt according to a modification example.

The projections 25 provided on the surface 23a of the recessed portion 23 are not limited to those illustrated in FIG. 2. One projection 25 may be provided on the central portion of the surface 23a of the recessed portion 23 as illustrated in FIG. 3A, two projections 25 may be provided as illustrated in FIG. 3B, and three projections 25 may be provided as illustrated in FIG. 3C. Although not shown, five or more projections 25 may be provided. Furthermore, the projection 25 that has a cross-shape as seen in the plan view as illustrated in FIG. 3D or the projections 25 that are linear as seen in the plan view as illustrated in FIG. 3E may also be provided. As described above, the shape of the projection 25 is not particularly limited.

Swaging Operation of Bolt

Next, a swaging operation of the bolt 2 configured as described above will be described by using FIGS. 4A to 4C.

Figure 4A:
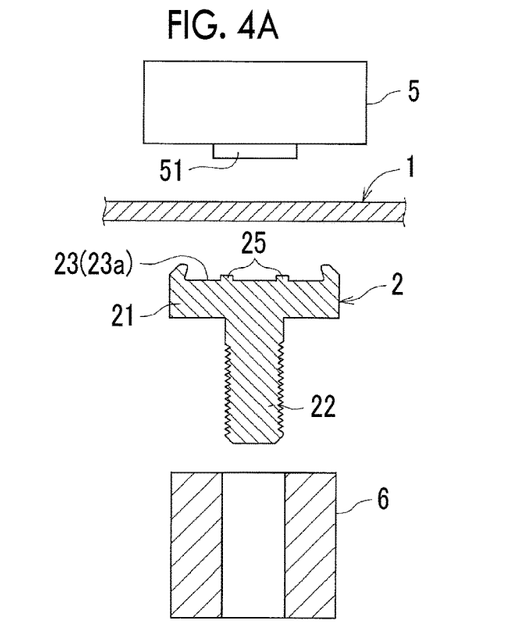
FIG. 4A is a view for describing a swaging operation of the bolt in the first embodiment.

First, as illustrated in FIG. 4A, the dash panel 1 and the head portion 21 of the bolt 2 are caused to face each other (more specifically, surface 23a of recessed portion 23 is caused to face dash panel 1), a die 5 is disposed on the dash panel 1 side, and a punch 6 is disposed on the bolt 2 side. The die 5 and the punch 6 are provided in a hydraulic or pneumatic lifting and lowering mechanism (not shown) and the die 5 and the punch 6 can be lifted or lowered independently of each other by an operation of the lifting and lowering mechanism.

A lower end portion of the die 5 is provided with a columnar portion 51 that is slightly smaller than the shape of the recessed portion 23 formed in the bolt 2 and in the swaging operation of the bolt 2, the columnar portion 51 presses the dash panel 1 toward the recessed portion 23 of the bolt 2. In addition, the punch 6 is a cylindrical member and an inner diameter dimension thereof is larger than the outer diameter of the screw portion 22 of the bolt 2 and is smaller than the outer diameter of the head portion 21. Therefore, in the swaging operation of the bolt 2, the screw portion 22 of the bolt 2 is inserted into the punch 6 and an upper end portion of the punch 6 abuts onto the head portion 21 of the bolt 2.

Figure 4B:
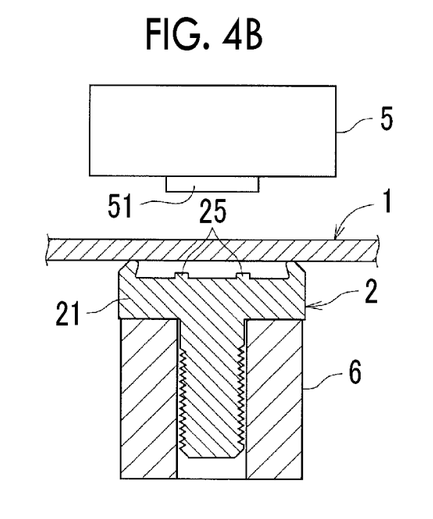
FIG. 4B is a view for describing the swaging operation of the bolt in the first embodiment.
Figure 4C:
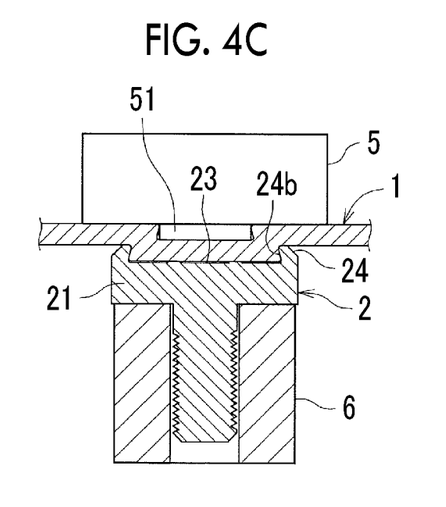
FIG. 4C is a view for describing the swaging operation of the bolt in the first embodiment.

As illustrated in FIG. 4B, the punch 6 is lifted in a state where the head portion 21 of the bolt 2 abuts onto the dash panel 1 such that the upper end portion of the punch 6 abuts onto the head portion 21 of the bolt 2. Then, as illustrated in FIG. 4C, the die 5 is lowered such that the columnar portion 51 of the die 5 is pressed against the dash panel 1 and a portion of the dash panel 1 is deformed and fitted into the recessed portion 23 of the head portion 21 of the bolt 2. As described above, the inner circumferential side surface 24b of the protruding portion 24 of the head portion 21 of the bolt 2 is outwardly inclined toward the recessed portion 23 side. Therefore, the portion of the dash panel 1 (portion of material constituting dash panel 1) fitted into the recessed portion 23 of the head portion 21 is inserted into the recessed portion 23 along the inner circumferential side surface 24b and the dash panel 1 and the head portion 21 of the bolt 2 are engaged with each other. Accordingly, the head portion 21 of the bolt 2 is swage-joined to the dash panel 1.

When the head portion 21 of the bolt 2 is swage-joined to the dash panel 1 as described above, the projections 25 which are provided on the surface of the recessed portion 23 of the head portion 21 of the bolt 2 are forcibly pressed by the dash panel 1. Accordingly, the projections 25 are partially crushed and rustproofing treatment layers on surfaces of the projections 25 are peeled off. Therefore, at the projections 25, an iron material of the head portion 21 of the bolt 2 is directly and forcibly pressed by the dash panel 1 and thus the dash panel 1 and the bolt 2 are favorably electrically connected.

When the swaging operation is finished in this manner, the die 5 retreats to an upper side and the punch 6 retreats to the lower side.

Fastening Operation of Earth Terminal

Figure 5A:
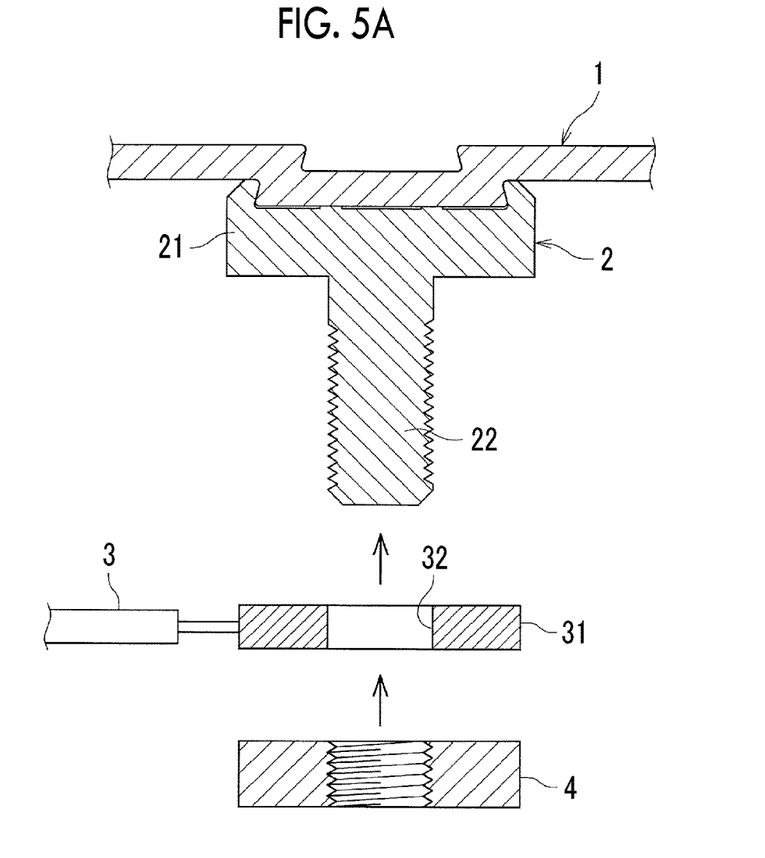
FIG. 5A is a view for describing a fastening operation of an earth terminal in the first embodiment.
Figure 5B:
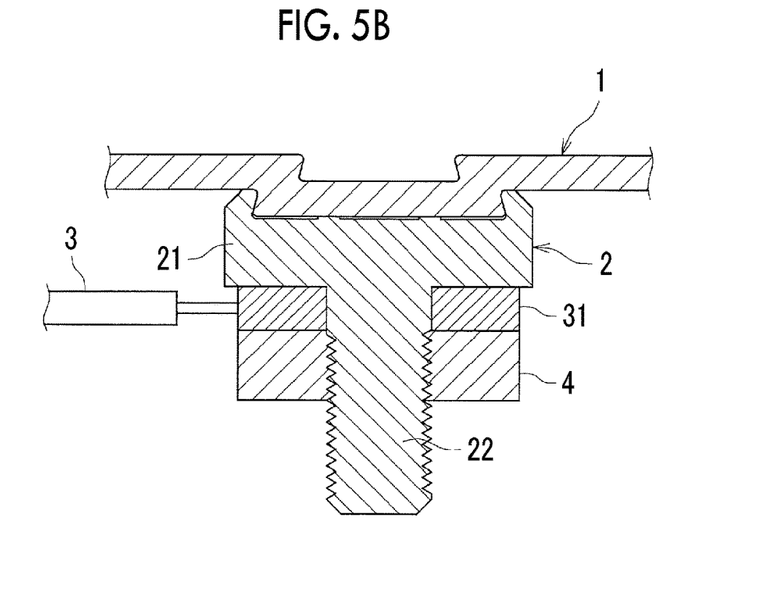
FIG. 5B is a view for describing the fastening operation of the earth terminal in the first embodiment.

In a fastening operation of the earth terminal 31, the earth terminal 31 is disposed as illustrated in FIG. 5A such that the screw portion 22 of the bolt 2 is inserted into the opening 32 of the earth terminal 31 and the nut 4 is screwed onto the screw portion 22 of the bolt 2 as illustrated in FIG. 5B such that the earth terminal 31 is interposed between the head portion 21 of the bolt 2 and the nut 4. Therefore, the dash panel 1 and the earth terminal 31 are electrically connected to each other via the bolt 2. Accordingly, an earth path is formed over the wire harness 3, the earth terminal 31, the bolt 2, and the dash panel 1.

As described above, in the present embodiment, the projections 25 protruding toward the dash panel 1 are provided on the surface 23a of the recessed portion 23, which is a facing surface of the head portion 21 of the bolt 2 that faces the dash panel 1, and the rustproofing treatment layers of the projections 25 are peeled off when the head portion 21 of the bolt 2 is swage joined to the dash panel 1 so that the dash panel 1 and the bolt 2 are favorably electrically connected to each other. Therefore, it is possible to favorably secure an earth path extending over the wire harness 3, the earth terminal 31, the bolt 2, and the dash panel 1 without forming a through-hole in the dash panel 1. As a result, it is possible to eliminate a possibility that rust is generated due to water intruding through a through-hole of a dash panel.

Second Embodiment

Figure 6:
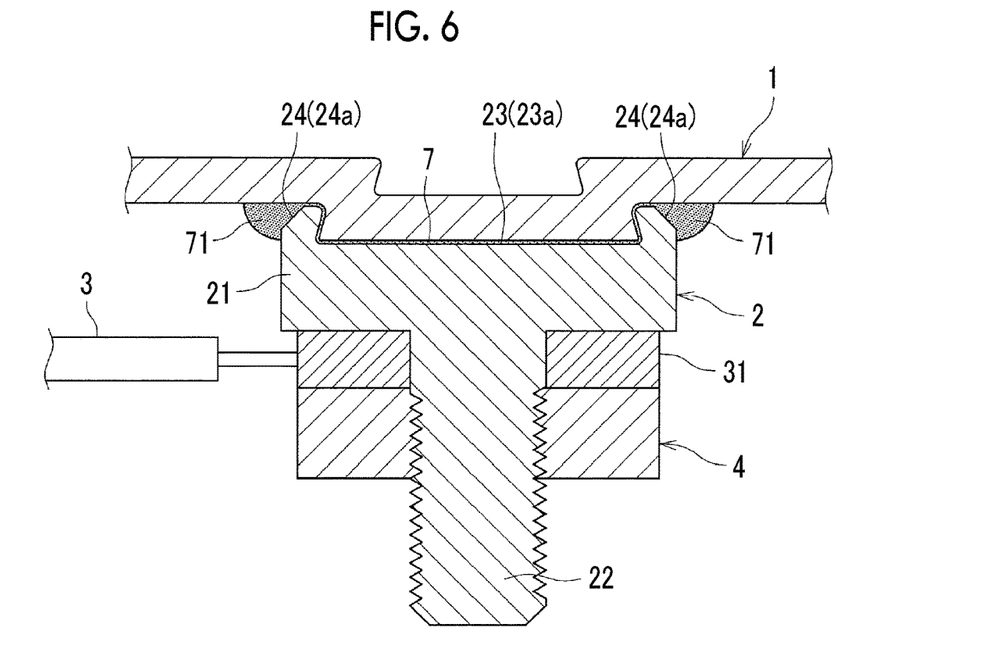
FIG. 6 is a sectional view illustrating a body earth structure according to a second embodiment.

Next, a second embodiment will be described. In the present embodiment, the structure of the head portion 21 of the bolt 2 and the swaging operation of the bolt 2 are different from those in the first embodiment. Therefore, the description will be made focusing on the difference between the second embodiment and the first embodiment.

Body Earth Structure

FIG. 6 is a sectional view illustrating a body earth structure according to the present embodiment. As illustrated in FIG. 6, no projection is provided on the surface 23a of the recessed portion 23 of the head portion 21 of the bolt 2 in the present embodiment and the surface of the recessed portion 23 is formed into a flat surface.

A feature of the present embodiment is that a conductive adhesive agent 7 is applied to the recessed portion 23 in advance at the time of the swaging operation of the bolt 2 such that the conductive adhesive agent 7 is interposed between the surface 23a of the recessed portion 23 and the dash panel 1 when the swaging operation of the bolt 2 is finished.

A conductive adhesive agent 71 that flows out from a space between the recessed portion 23 and the dash panel 1 at the time of the swaging operation of the bolt 2 is present along a boundary between the outer circumferential side surface 24a of the protruding portion 24 of the head portion 21 of the bolt 2 and the dash panel 1.

Swaging Operation of Bolt

Next, the swaging operation of the bolt 2 in the present embodiment will be described by using FIGS. 7A to 7C. The following description will also be made focusing on the difference between the second embodiment and the first embodiment.

Figure 7A:
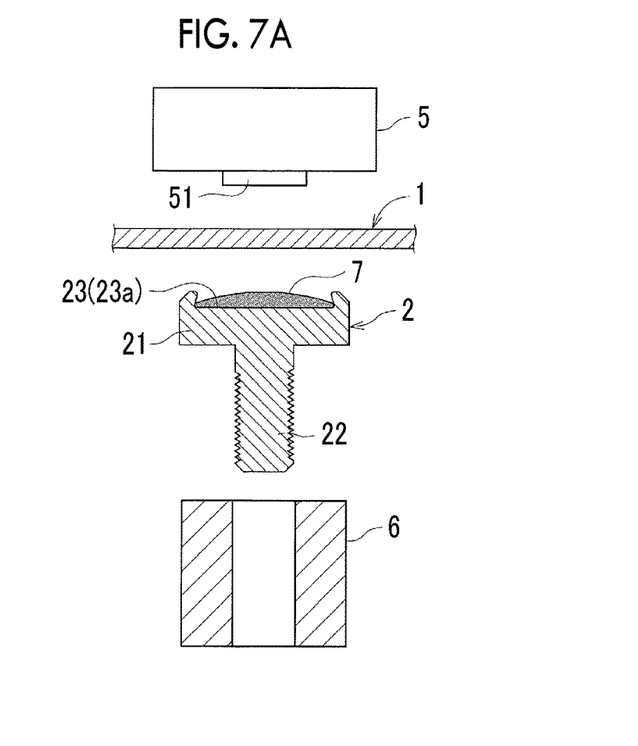
FIG. 7A is a view for describing a swaging operation of a bolt in the second embodiment.

First, as illustrated in FIG. 7A, the conductive adhesive agent 7 is applied to the recessed portion 23 of the head portion 21 of the bolt 2 in advance and the head portion 21 of the bolt 2 and the dash panel 1 are caused to face each other. The type of the conductive adhesive agent 7 used here is not particularly limited and examples thereof include a filler sintering type adhesive agent or a filler dispersing type adhesive agent which includes a filler formed of inorganic or organic particles.

Figure 7B:
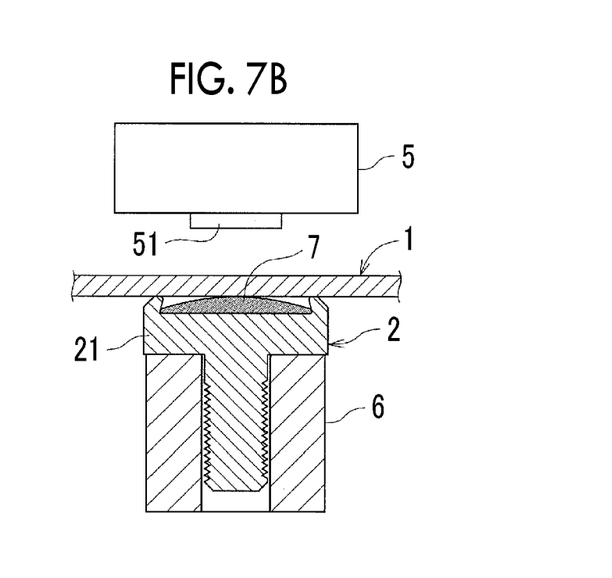
FIG. 7B is a view for describing the swaging operation of the bolt in the second embodiment.
Figure 7C:
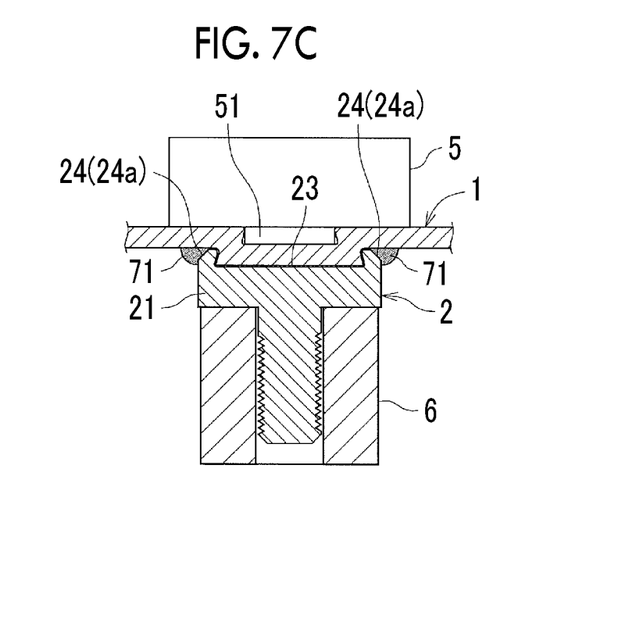
FIG. 7C is a view for describing the swaging operation of the bolt in the second embodiment.

Then, as with the case of the first embodiment, the punch 6 is lifted in a state where the head portion 21 of the bolt 2 abuts onto the dash panel 1 such that the upper end portion of the punch 6 abuts onto the head portion 21 of the bolt 2 (refer to FIG. 7B). Then, as illustrated in FIG. 7C, the die 5 is lowered such that the columnar portion 51 of the die 5 is pressed against the dash panel 1 and a portion of the dash panel 1 is deformed and fitted into the recessed portion 23 of the head portion 21 of the bolt 2. Accordingly, the head portion 21 of the bolt 2 is swage-joined to the dash panel 1.

The conductive adhesive agent 71 that flows out from the space between the recessed portion 23 and the dash panel 1 at this time is present along the boundary between the outer circumferential side surface 24a of the protruding portion 24 of the head portion 21 of the bolt 2 and the dash panel 1.

The fastening operation of the earth terminal 31 is the same as that in the first embodiment and thus description thereof will be omitted here.

As described above, in the present embodiment, the conductive adhesive agent 7 is interposed between the surface 23a of the recessed portion 23 and the dash panel 1. Therefore, it is possible to favorably electrically connect the dash panel 1 and the bolt 2 to each other via the conductive adhesive agent 7 while eliminating a possibility of electrolytic corrosion caused by the aluminum dash panel 1 and the bolt 2 with the conductive adhesive agent 7 interposed between the dash panel 1 and the bolt 2. That is, with the present embodiment, it is also possible to favorably secure an earth path extending over the wire harness 3, the earth terminal 31, the bolt 2, and the dash panel 1 without forming a through-hole in the dash panel 1. As a result, it is possible to eliminate a possibility that rust is generated due to water intruding through a through-hole of a dash panel.

OTHER EMBODIMENTS

The aspect of the disclosure is not limited to the above-described embodiments and all modifications and applications included in the scope of claims and a scope equivalent to the scope can be made.

For example, the structures in the embodiments may be used in combination. That is, a structure, in which the projections 25 are provided on the surface 23a of the recessed portion 23 of the head portion 21 of the bolt 2 and the conductive adhesive agent 7 is applied to the recessed portion 23 in advance at the time of the swaging operation of the bolt 2 such that the conductive adhesive agent 7 is interposed between the surface 23a of the recessed portion 23 and the dash panel 1 when the swaging operation of the bolt 2 is finished, may be used.

In addition, in the first embodiment, the projections 25 are partially crushed at the time of the swaging operation such that the rustproofing treatment layers are peeled off. The aspect of the disclosure is not limited thereto and the projections 25 do not need to be crushed as long as the rustproofing treatment layers on the surfaces of the projections 25 are peeled off.

In addition, in the above-described embodiments, the head portion 21 of the bolt 2 has a columnar shape. The aspect of the disclosure is not limited thereto and the head portion 21 may have a hexagonal cylinder-like shape.

The aspect of the disclosure can be applied to a structure in which an earth terminal for earthing of an electrical component of a vehicle is fastened to a vehicle body panel.

What is claimed is:

1. A body earth structure for a vehicle, the body earth structure comprising a bolt of which a head portion is swage-joined to an aluminum vehicle body panel, the bolt being provided to fasten an earth terminal to the vehicle, wherein the bolt includes a projection that protrudes toward the vehicle body panel, on a facing surface of the head portion of the bolt, the facing surface being provided to face the vehicle body panel.

2. The body earth structure according to claim 1, wherein: the head portion of the bolt is provided with
- a protruding portion provided by an outer edge of the head portion protruding in a direction of the facing surface, and
- a recessed portion that is a region positioned radially inward of the protruding portion and is approximately circular as seen in a plan view;
- an outer circumferential side surface of the protruding portion is outwardly inclined toward the facing surface; and
- an inner circumferential side surface of the protruding portion is outwardly inclined toward the recessed portion.

3. The body earth structure according to claim 1, wherein the bolt is subjected to a rustproofing treatment.

4. A body earth structure for a vehicle, the body earth structure comprising:
- a bolt of which a head portion is swage-joined to an aluminum vehicle body panel, the bolt being provided to fasten an earth terminal to the vehicle and including a projection that protrudes toward the vehicle body panel, on a facing surface of the head portion of the bolt, the facing surface being provided to face the vehicle body panel; and
- a conductive adhesive agent interposed between the facing surface of the head portion of the bolt and the vehicle body panel.

5. The body earth structure according to claim 4, wherein: the head portion of the bolt is provided with
- a protruding portion provided by an outer edge of the head portion protruding in a direction of the facing surface, and
- a recessed portion that is a region positioned radially inward of the protruding portion and is approximately circular as seen in a plan view;
- an outer circumferential side surface of the protruding portion is outwardly inclined toward the facing surface; and
- an inner circumferential side surface of the protruding portion is outwardly inclined toward the recessed portion.

6. The body earth structure according to claim 4, wherein the bolt is subjected to a rustproofing treatment.

* * * * *